(12) United States Patent
Morgan

(10) Patent No.: US 10,035,549 B2
(45) Date of Patent: Jul. 31, 2018

(54) DETERMINATION OF AERODYNAMIC ACTUATION COMMANDS

(71) Applicant: GM GLOBAL TECHNOLOGY OPERATIONS LLC, Detroit, MI (US)

(72) Inventor: Chris Morgan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 15/210,203

(22) Filed: Jul. 14, 2016

(65) Prior Publication Data

US 2017/0080987 A1  Mar. 23, 2017

Related U.S. Application Data

(60) Provisional application No. 62/219,814, filed on Sep. 17, 2015.

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B62D 37/02* | (2006.01) |
| *B62D 35/00* | (2006.01) |

(52) U.S. Cl.
CPC ........... *B62D 37/02* (2013.01); *B62D 35/005* (2013.01); *B62D 35/007* (2013.01)

(58) Field of Classification Search
CPC ..... B62D 35/005; B62D 35/007; B62D 37/02
USPC .......................................................... 701/49
See application file for complete search history.

(56) References Cited

U.S. PATENT DOCUMENTS

| | | | | |
|---|---|---|---|---|
| 4,810,022 A | * | 3/1989 | Takagi ................. | B62D 35/005 180/197 |
| 9,308,950 B2 | * | 4/2016 | Wolf .................... | B62D 35/005 |

(Continued)

FOREIGN PATENT DOCUMENTS

| | | |
|---|---|---|
| CN | 101287640 A | 10/2008 |
| CN | 102826004 A | 12/2012 |

(Continued)

*Primary Examiner* — Harry Y Oh
(74) *Attorney, Agent, or Firm* — Quinn IP Law

(57) ABSTRACT

A vehicle has first and second portions, with a front aerodynamic element located in the first portion and a rear aerodynamic element located in the second portion. The front and rear aerodynamic elements are each independently movable to respective deployment positions between respective stowed positions and respective fully-extended positions. A controller is operatively connected to each of the front and rear aerodynamic elements and has a processor and tangible, non-transitory memory. The controller is programmed to obtain a front target position $(T_{f,n})$ for the front aerodynamic element at a current time step (n) based at least partially on at least one vehicle state parameter at a previous time-step (n−1) and a detected position $(D_{r,n-1})$ of the rear aerodynamic element at the previous time-step (n−1).

17 Claims, 2 Drawing Sheets

(56) References Cited

U.S. PATENT DOCUMENTS

| | | | | |
|---|---|---|---|---|
| 2010/0090497 A1* | 4/2010 | Beckon | ............... | B60Q 1/2661 |
| | | | | 296/180.5 |
| 2012/0053788 A1* | 3/2012 | Amino | ............... | B60G 17/0165 |
| | | | | 701/37 |
| 2012/0275172 A1* | 11/2012 | Mizuno | ................. | B60Q 1/085 |
| | | | | 362/464 |
| 2013/0226414 A1* | 8/2013 | De Luca | ............. | B62D 35/007 |
| | | | | 701/49 |
| 2017/0088106 A1* | 3/2017 | Fahland | ............... | B60T 8/1766 |
| 2017/0088192 A1* | 3/2017 | Auden | ................... | B62D 35/00 |

FOREIGN PATENT DOCUMENTS

| CN | 104670348 A | 6/2015 |
|---|---|---|
| CN | 104787132 A | 7/2015 |
| GB | 2495983 A | 5/2013 |

* cited by examiner

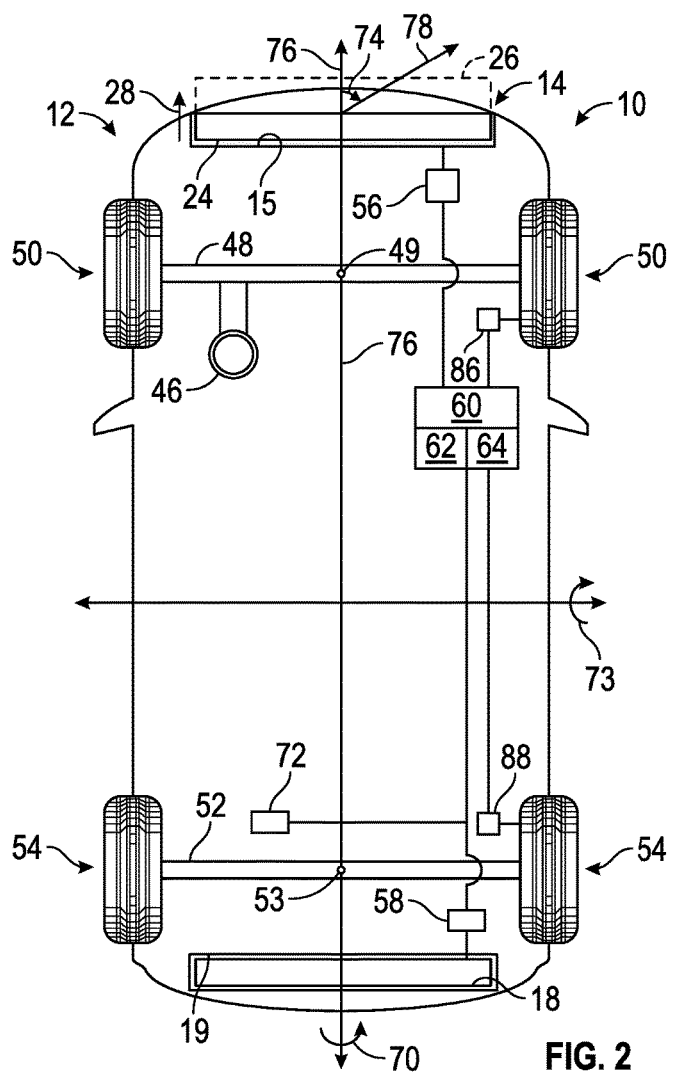
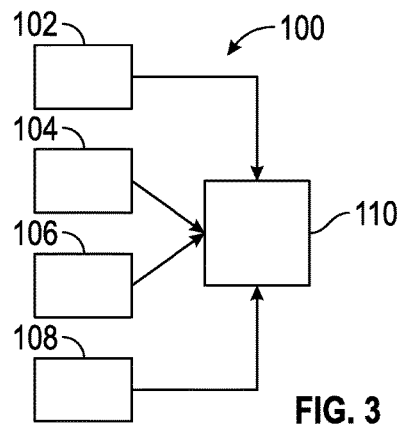
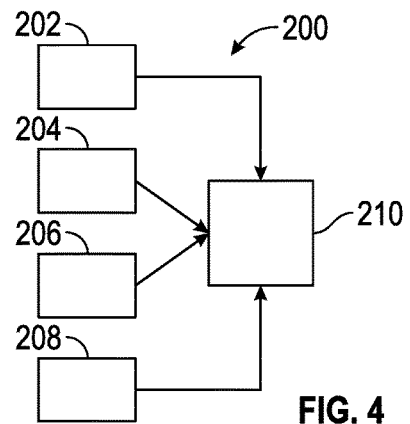
FIG. 2
FIG. 3
FIG. 4

DETERMINATION OF AERODYNAMIC ACTUATION COMMANDS

CROSS-REFERENCE TO RELATED APPLICATIONS

This application claims the benefit of U.S. Provisional Patent Application Ser. No. 62/219,814, filed on Sep. 17, 2015, the disclosure of which is hereby incorporated by reference.

TECHNICAL FIELD

The disclosure relates generally to determination of aerodynamic actuation commands, and more specifically, to determination of a target position for an aerodynamic element, without requiring a predictive model.

BACKGROUND

A moving device is capable of turning the air-flow through which it moves, generating a lift force. Aerodynamic elements may be employed in devices, such as vehicles, to achieve downforce for improving vehicle traction and cornering abilities. Aerodynamic elements are also employed as to reduce drag, reduce wind noise and prevent other causes of aerodynamic instability.

SUMMARY

A vehicle has first and second portions, with a front aerodynamic element located in the first portion and a rear aerodynamic element located in the second portion. The front and rear aerodynamic elements are each independently movable to respective deployment positions between respective stowed positions and respective fully-extended positions. A controller is operatively connected to each of the front and rear aerodynamic elements and has a processor and tangible, non-transitory memory. The controller is programmed to obtain a front target position ($T_{f,n}$) for the front aerodynamic element at a current time step (n) based at least partially on at least one vehicle state parameter at a previous time-step (n−1) and a detected position ($D_{r,n-1}$) of the rear aerodynamic element at the previous time-step (n−1).

Determining the front target position ($T_{f,n}$) for the front aerodynamic element at the current time step (n) includes obtaining a desired front lift factor ($L_{f,\ n}$) for the front aerodynamic element at the current time step (n). The detected position ($D_{r,n-1}$) of the rear aerodynamic element at the previous time-step (n−1) may be obtained via a position sensor. Determining the front target position ($T_{f,n}$) for the front aerodynamic element at the current time step (n) includes obtaining a front characterization dataset for predefined combinations of the respective deployment positions of the front and rear aerodynamic elements.

Obtaining the vehicle state parameter at the previous time-step (n−1) may include obtaining a vehicle roll angle ($R_{n-1}$) at the previous time-step (n−1). The vehicle state parameter at the previous time-step (n−1) may include obtaining a pitch angle ($P_{n-1}$) at the previous time-step (n−1). The vehicle state parameter at the previous time-step (n−1) may include a cross-wind angle ($W_{n-1}$) at the previous time-step (n−1). The cross-wind angle ($W_{n-1}$) is defined as an angle between a central longitudinal axis of the vehicle and an external air-flow direction.

A first ride sensor may be operatively connected to the controller and configured to detect a front ride height. The front ride height may be defined as a distance between a center of the front axle and a ground level. The vehicle state parameter may include the front ride height. A second ride sensor may be operatively connected to the controller and configured to detect a rear ride height. The rear ride height may be defined as a distance between a center of the rear axle and a ground level. The vehicle state parameter may include the rear ride height.

The controller may be programmed to determine a rear target position ($T_{r,n}$) for the rear aerodynamic element at the current time step (n), based at least partially on a detected position ($D_{r,n-1}$) of the front aerodynamic element at the previous time-step (n−1), at least one vehicle state parameter at a previous time-step (n−1), a desired rear lift factor ($L_{r,\ n}$) for the rear active aerodynamic element at the current time step (n) and a rear characterization dataset for predefined combinations of the respective deployment positions of the front and rear aerodynamic elements.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic plan view of the device of FIG. 1;

FIG. 3 is a flowchart for a method for determining a front target position for the front aerodynamic element of FIG. 1; and FIG. 4 is a flowchart for a method for determining a rear target position for the rear aerodynamic element of FIG. 1.

DETAILED DESCRIPTION

Figure 1:
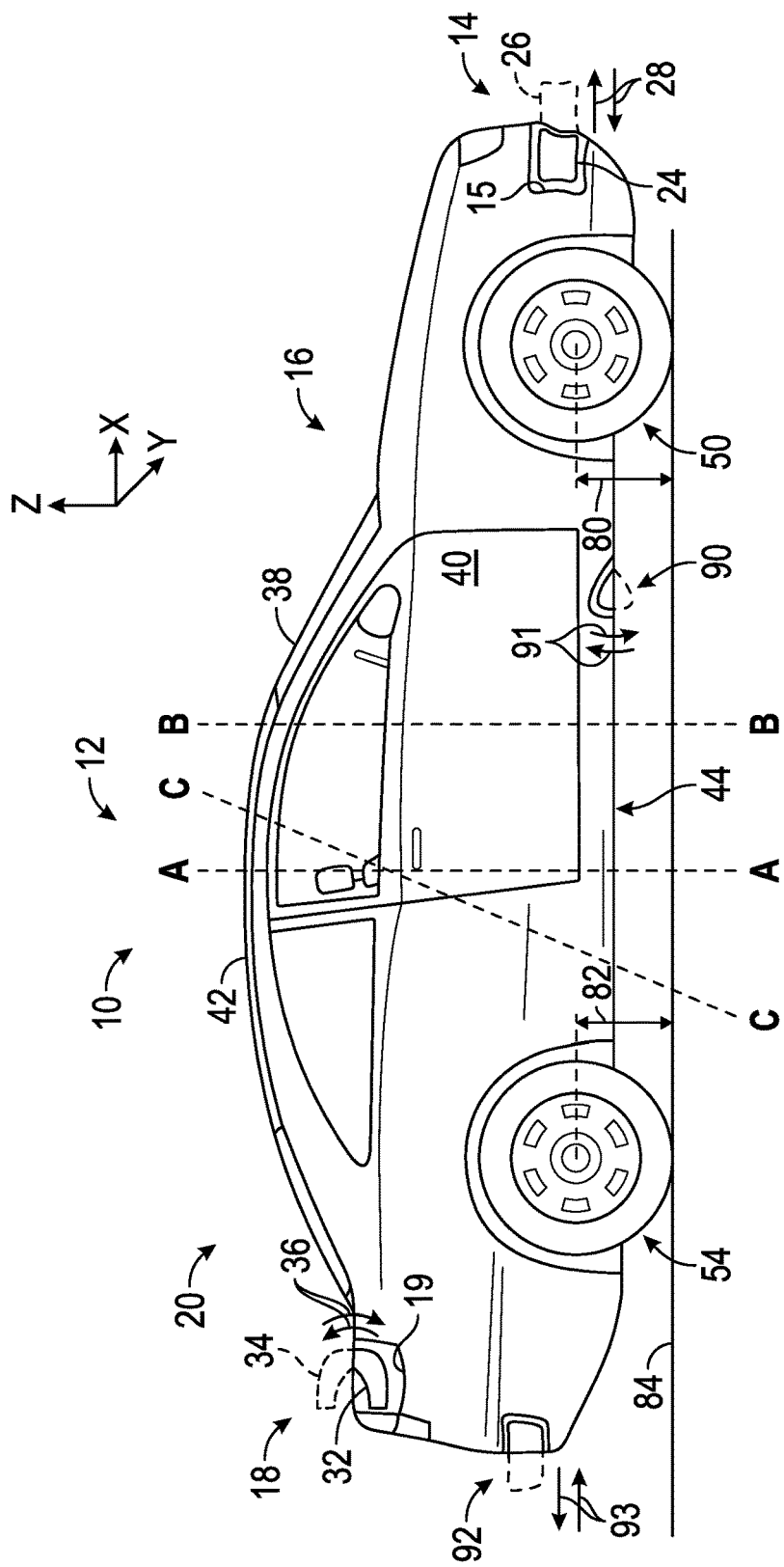
FIG. 1 is a schematic fragmentary side view of a device having a front active aerodynamic element and a rear active aerodynamic element.

Referring to the Figures, wherein like reference numbers refer to the same or similar components throughout the several views, FIG. 1 is a schematic fragmentary side view of a device 10. In the embodiment shown, the device 10 is a vehicle 12. However, it is to be understood that the device 10 may be a passenger vehicle, performance vehicle, industrial vehicle, robot, a farm implement, sports-related equipment or any other type of movable apparatus. The vehicle 12 may take many different forms and include multiple and/or alternate components and facilities. While an example vehicle 12 is shown in the Figures, the components illustrated in the Figures are not intended to be limiting. Indeed, additional or alternative components and/or implementations may be used.

Referring to FIG. 1, a first aerodynamic element 14 is located in a first portion 16 of the vehicle 12. A second aerodynamic element 18 is located in a second portion 20 of the vehicle 12. In the embodiment shown, the first portion 16 correlates to the front portion of the vehicle 12 and the second portion 20 correlates to the rear portion of the vehicle 12 and the first aerodynamic element 14 is referred to as the front aerodynamic element 14 and the second aerodynamic element 18 is referred to as the rear aerodynamic element 18. In one example, the first and second portions 16, 20 are separated by lines A-A. In another example, the first and second portions 16, 20 are separated by lines B-B. In yet another example, the first and second portions 16, 20 are separated by lines C-C.

FIG. 2 is a schematic plan view of the vehicle 12. Referring to FIGS. 1-2, the front aerodynamic element 14 is movable to any front deployment position between a stowed position 24 and a fully-extended position 26. The front aerodynamic element 14 may be deployed along a one-dimensional path 28 (which may be straight or curvilinear) such that its position is represented as a percentage of full-deployment.

Similarly, the rear aerodynamic element 18 is movable to any rear deployment position between a stowed position 32 and a fully-extended position 34. The rear aerodynamic element 18 may be deployed along a one-dimensional path 36 (which may be straight or curvilinear) such that the "position" of the aerodynamic element is represented as a percentage of full-deployment. In the example shown, 100% deployment refers to the respective fully-extended positions 26, 34 while 0% deployment refers to the respective stowed positions 24, 32. However, it is to be understood that each of the positions may represented in a three-dimensional spatial coordinate system, spherical coordinate system (r, θ, φ), or any other multi-dimensional coordinate system suitable to the application at hand. For example, the positions of the front and rear aerodynamic elements 14, 18 may be represented in Cartesian coordinates as $(x_f, y_f, z_f)$ and $(x_r, y_r, z_r)$, respectively, and spherical coordinates as $(r_f, \theta_f, \varphi_f)$ and $(r_r, \theta_r, \varphi_r)$ respectively.

Referring to FIG. 1, the front and rear aerodynamic elements 14, 18 may be supported by respective front and rear housing 15, 19, such that the front and rear aerodynamic elements 14, 18 are at least partially inside the respective front and rear housing 15, 19 when in the respective stowed positions 24, 32. The front and rear aerodynamic elements 14, 18 may employ any type of actuation mechanism (not shown) known to those skilled in the art to move them along their respective paths 28, 36, including but not limited to, shape memory alloys, hydraulic valves, linear actuators, rotary actuators and motors of any kind. Referring to FIG. 1, the front and rear aerodynamic elements 14, 18 may be positioned on any part of the vehicle body 38, including but not limited to, the lateral sides 40, the top body 42 and the under-body 44. Referring to FIG. 2, the vehicle 12 may include a steering wheel 46, a front axle 48 operatively connected to front tires 50 and a rear axle 52 operatively connected to rear tires 54. Referring to FIG. 2, the vehicle 12 may include respective position sensors 56, 58 to detect the respective positions of the front and rear aerodynamic elements 14, 18 in real-time.

The position of the front and rear aerodynamic elements 14, 18 may play significant roles in the dynamics of the vehicle 12 and may be consumed as inputs for various control algorithms, improving the functioning of the vehicle 12. However, the relationships between multiple active aerodynamic elements and vehicle state characteristics are circular and governed by recursive equations. For example, the front lift force or force along the vertical axis Z is a function of position of the front aerodynamic element 14 and front vehicle ride height 80 (shown in FIG. 1 and described in detail below) as well as a function of position of the rear aerodynamic element 18 and rear vehicle ride height 82 (shown in FIG. 1 and described in detail below). In turn, the front and rear ride heights 80, 82 are each functions of both the front lift force and the rear lift force and other vehicle inputs. The system of equations must be solved continuously in real time for a given downforce target in order to achieve desired aerodynamic forces. Vehicle aerodynamic models may involve predicting the position of the aerodynamic elements using aerodynamic actuator models and chassis models in order to arrive at the desired actuation commands. However, this requires online predictive models or iterative solvers and an extensive computational burden.

Referring to FIGS. 1-2, a controller 60 is operatively connected to the front and rear aerodynamic elements 14, 18 and various other components of the vehicle 12. The controller 60 may be an integral portion of, or a separate module operatively connected to, other control modules of the vehicle 12. Referring to FIG. 2, the controller 60 has a processor 62, and tangible, non-transitory memory 64, on which is recorded instructions for executing a first method 100 and a second method 200. Method 100, described below with reference to FIG. 3, is for determining a front target position $(T_{f,n})$ for the front aerodynamic element 14 at a current time step (n). Method 200, described below with reference to FIG. 4, is for determining a rear target position command $(T_{r,n})$ for the rear aerodynamic element 18 at the current time step (n). The methods 100, 200 may each be employed with vehicle state parameters that are directly affected by the choice of actuation at the current time step (n). The methods 100, 200 provide the advantage or ability to use data from the previous time-step to avoid having to predict their values.

The current time step (n) refers to the current controller computation loop while the previous time step (n−1) refers to the immediately prior controller computation loop. The methods 100 and 200 below use measured vehicle state data and position data from a previous controller computation loop or time step to solve for a target position or actuation command at the current controller computation loop or time step. This circumvents the need to predict these quantities at controller computation loop, which would require actuator & vehicles models to be solved online using an iterative method. Additionally, position data for the front aerodynamic element 14 (from a previous time step) is used to determine the target position for the rear aerodynamic element 18 (at the current time step) and vice-versa.

Referring now to FIG. 3, a flowchart of the method 100 stored on and executable by the controller 60 of FIG. 1 is shown. Method 100 need not be applied in the specific order recited herein. Furthermore, it is to be understood that some blocks may be added or eliminated. Method 100 may each be initialized such that the front aerodynamic element 14 is in the stowed position 24 at an initial time step (n=0), e.g., at vehicle key-on. Any suitable initialization conditions may be employed.

Method 100 may begin with block 102 where the controller 60 is programmed to obtain at least one vehicle state parameter at a previous time-step (n−1). Referring to FIG. 2, the vehicle state parameters may include a roll angle 70 $(R_{n-1})$, measured via a roll sensor 72 in electronic communication with the controller 60. Referring to FIG. 2, the vehicle state parameters may include a pitch angle 73 $(P_{n-1})$ at the previous time-step (n−1). Referring to FIG. 2, the vehicle state parameters may include a cross-wind angle 74 $(W_{n-1})$ at the previous time-step (n−1). The cross-wind angle $(W_{n-1})$ may be defined as the angle between a central longitudinal axis 76 of the vehicle 12 and an external air-flow direction 78.

Referring to FIG. 1, the vehicle state parameters may include a front ride height 80 and rear ride height 82. Referring to FIG. 1, in the embodiment shown, the front ride height 80 is defined as the distance between the lowest point of the vehicle body 38 at the center 49 of the front axle 48 and the ground level 84. Referring to FIG. 1, in the embodiment shown, the rear ride height 82 is defined as the distance between the lowest point of the vehicle body 38 at the center 53 of the rear axle 52 and the ground level 84.

Referring to FIG. 1, the vehicle 12 may include a first ride sensor 86 and a second ride sensor 88, in electronic communication with the controller 60, for detecting the first and second ride heights 80, 82 and communicating the information to the controller 60. Because a ride height in general refers to the distance between a flat, level surface, and any part of a vehicle 12 other than those parts designed to contact the ground level 84 (such as tires, tracks, skis, etc.), the ride height 80, 82 may be variably defined, depending on the application at hand.

In block 104 of FIG. 3, the controller 60 is configured to obtain a desired front lift factor ($L_{f,n}$) for the front aerodynamic element 14 at the current time step (n). The desired front lift factor ($L_{f,n}$) is in a vertical direction Z with units of force multiplied by area (e.g. Newton-meter squared) and may be obtained as an output of other algorithms of the vehicle 12 and may be a product of user-input, external forces in the X and Y directions and other factors. The lift factor (L) is defined herein as the product of a lift coefficient (C) and an associated reference area (RA), such that L=(C*RA). The lift factor (L) relates the lift generated by a lifting body to the fluid density (ρ) around the body (e.g. air density) and the vehicle speed (v), such that:

Measured Lift Force (Z direction)=
$C*RA*\frac{1}{2}*\rho*v^2 = L*\frac{1}{2}*\rho*v^2$ In block 106 of FIG. 3, the controller 60 is configured to obtain a front characterization dataset for predefined combinations of deployment positions of the front and rear aerodynamic elements 14, 18. A subject vehicle 12 may be placed in a wind tunnel and various sensors known to those skilled in the art are employed to measure the forces directed at the vehicle. Table 1 below shows an example set-up for the front characterization dataset. The set-up of Table 1 is intended as a non-limiting example.

and a second rear aerodynamic element 92 (movable along path 93). The target position for the front aerodynamic element 14 (at the current time step) would be informed by the measured or calculated positions of each of the second front aerodynamic element 90, the rear aerodynamic element 18 and the second rear aerodynamic element 92. The target position for the rear aerodynamic element 18 (at the current time step (n)) would be informed by the measured or calculated positions of each of the second rear aerodynamic element 92, the front aerodynamic element 14 and the second front aerodynamic element 90.

In block 110 of FIG. 3, the controller 60 is configured to obtain the front target position ($T_{f,n}$) for the front aerodynamic element 14 at the current time step (n) based at least partially on a detected position ($D_{r,n-1}$) of the rear aerodynamic element 18 at the previous time-step (n−1), the desired front lift factor ($L_{f,n}$), the at least one vehicle state parameter at the previous time-step (n−1) and the front characterization dataset (see Table 1). The controller 60 may employ various interpolation techniques to obtain the front target position ($T_{f,n}$), such as the interpolation equation below, in which the parameters on the right side of the equation are known and the parameter on the left is unknown. Additionally, the controller 60 may employ bi-linear interpolation between four permutations of the front and rear deployment positions.

$$d = d_1 + \frac{g - g_1}{g_2 - g_1}(d_2 - d_1)$$

Referring now to FIG. 4, a flowchart of the method 200 stored on and executable by the controller 60 of FIG. 1 is shown. Method 200 need not be applied in the specific order recited herein. Furthermore, it is to be understood that some blocks may be added or eliminated. Method 200 may begin

TABLE 1

| Front Deployment % | Rear Deployment % | Roll Angle | Pitch Angle | Vehicle Speed | Front & Rear Ride Heights | *Front* Lift Factor |
|---|---|---|---|---|---|---|
| 0 | 0 | Sweep R1-R2 | Sweep P1-P2 | Sweep v1-v2 | Sweep | Measure |
| 100 | 0 | Sweep R1-R2 | Sweep P1-P2 | Sweep v1-v2 | Sweep | Measure |
| 0 | 100 | Sweep R1-R2 | Sweep P1-P2 | Sweep v1-v2 | Sweep | Measure |
| 100 | 100 | Sweep R1-R2 | Sweep P1-P2 | Sweep v1-v2 | Sweep | Measure |
| 50 | 50 | Sweep R1-R2 | Sweep P1-P2 | Sweep v1-v2 | Sweep | Measure |
| 0 | 50 | Sweep R1-R2 | Sweep P1-P2 | Sweep v1-v2 | Sweep | Measure |
| 50 | 0 | Sweep R1-R2 | Sweep P1-P2 | Sweep v1-v2 | Sweep | Measure |
| 50 | 100 | Sweep R1-R2 | Sweep P1-P2 | Sweep v1-v2 | Sweep | Measure |
| 100 | 50 | Sweep R1-R2 | Sweep P1-P2 | Sweep v1-v2 | Sweep | Measure |

In block 108 of FIG. 3, the controller 60 is configured to obtain a detected position ($D_{r,n-1}$) of the rear aerodynamic element 18 at the previous time-step (n−1), via the position sensor 58. Thus, the detected position ($D_{r,n-1}$) of the rear aerodynamic element 18 (from a previous time step) is used to determine the target position for the front aerodynamic element 14 (at the current time step). The device 10 may include more than two active aerodynamic elements, in which case the calculated position commands of any given element would be informed by the measured or calculated positions of all of the other elements. For example, referring to FIG. 1, the vehicle 12 may include the front aerodynamic element 14, a second front aerodynamic element 90 (which rotates out along path 91), the rear aerodynamic element 18 with block 202 where the controller 60 is programmed to obtain at least one vehicle state parameter at a previous time-step (n−1). Method 200 may each be initialized such that the rear aerodynamic element 18 is in the stowed position 32 at an initial time step (n=0), e.g., at vehicle key-on.

Method 200 may begin with block 202 where the controller 60 is programmed to obtain at least one vehicle state parameter at a previous time-step (n−1). Block 202 is the same as block 102. Referring to FIG. 2, the vehicle state parameters may include a roll angle 70 ($R_{n-1}$), a pitch angle 73 ($P_{n-1}$), a cross-wind angle 74 ($W_{n-1}$), a front ride height 80 and a rear ride height 82, as described above.

In block 204 of FIG. 4, the controller 60 is configured to obtain a desired rear lift factor ($L_{r,n}$) for the rear aerodynamic element 18 at the current time step (n). The desired rear lift factor ($L_{f,n}$) is in a vertical direction Z with units of force multiplied by area (e.g. Newton-meter squared) and may be obtained as an output of other algorithms of the vehicle 12, as a product of user input factors, external forces in the X and Y direction and other factors. The lift factor (L) is defined herein as the product of a lift coefficient (C) and an associated reference area (RA), such that L=(C*RA). The lift factor (L) relates the lift generated by a lifting body to the fluid density (ρ) around the body (e.g. air density) and the vehicle speed (v), such that:

Measured Lift Force (Z direction)=
$C*RA*\frac{1}{2}*\rho*v^2 = L*\frac{1}{2}*\rho*v^2$ In block 206 of FIG. 4, the controller 60 is configured to obtain a rear characterization dataset for predefined combinations of deployment positions of the front and rear aerodynamic elements 14, 18. A subject vehicle 12 may be placed in a wind tunnel and various sensors known to those skilled in the art are employed to measure the forces directed at the vehicle. Table 2 below shows an example set-up for the rear characterization dataset. The set-up of Table 2 is intended as a non-limiting example.

TABLE 2

| Front Deployment % | Rear Deployment % | Roll Angle | Pitch Angle | Vehicle Speed | Front & Rear Ride Heights | *Rear* Lift Factor |
|---|---|---|---|---|---|---|
| 0 | 0 | Sweep R1-R2 | Sweep P1-P2 | Sweep v1-v2 | Sweep | Measure |
| 100 | 0 | Sweep R1-R2 | Sweep P1-P2 | Sweep v1-v2 | Sweep | Measure |
| 0 | 100 | Sweep R1-R2 | Sweep P1-P2 | Sweep v1-v2 | Sweep | Measure |
| 100 | 100 | Sweep R1-R2 | Sweep P1-P2 | Sweep v1-v2 | Sweep | Measure |
| 50 | 50 | Sweep R1-R2 | Sweep P1-P2 | Sweep v1-v2 | Sweep | Measure |
| 0 | 50 | Sweep R1-R2 | Sweep P1-P2 | Sweep v1-v2 | Sweep | Measure |
| 50 | 0 | Sweep R1-R2 | Sweep P1-P2 | Sweep v1-v2 | Sweep | Measure |
| 50 | 100 | Sweep R1-R2 | Sweep P1-P2 | Sweep v1-v2 | Sweep | Measure |
| 100 | 50 | Sweep R1-R2 | Sweep P1-P2 | Sweep v1-v2 | Sweep | Measure |

Additionally, the aerodynamic front and rear lift factor may each be represented by a surface polynomial or any other representation of the characterization space. In a non-limiting example, the surface polynomial may be $Z=[A+Bx+Cy+Dx*y+Dx^2+Ey^2]$, where A-E are constants obtained by fitting and x, y are the vehicle state parameters. In block 208 of FIG. 4, the controller 60 is configured to obtain a detected position ($D_{f,n-1}$) of the front aerodynamic element 14 at the previous time-step (n−1), via the position sensor 56. Thus, the detected position ($D_{f,n-1}$) of the front aerodynamic element 14 (from a previous time step (n−1)) is used to determine the target position for the rear aerodynamic element 18 (at the current time step (n)).

In block 210 of FIG. 4, the controller 60 is configured to obtain the rear target position ($T_{r,n}$) for the rear aerodynamic element 18 at the current time step (n) based at least partially on the detected position ($D_{f,n-1}$) of the front aerodynamic element 14 at the previous time-step (n−1), the desired rear lift factor ($L_{r,n}$), the at least one vehicle state parameter at the previous time-step (n−1) and the rear characterization dataset (see an example in Table 2). The controller 60 may employ various interpolation techniques to obtain the front target position ($T_{f,n}$), such as the interpolation equation shown above.

In summary, the methods 100 and 200 (executed by the controller 60) enable control of multiple independent active aerodynamic elements to simultaneously achieve aerodynamic force targets for each element with a low computational burden. This direct method to achieve target aerodynamic forces does not require online predictive models or iterative solvers which minimizes computational burden.

As noted above, the controller 60 of FIG. 1 may include a computing device that employs an operating system or processor 62 and memory 64 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 62 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for determining respective front and rear target positions for respective front and rear aerodynamic elements at a current time step a vehicle having a controller and at least one position sensor configured to obtain respective detected positions of the front and rear aerodynamic elements, the method comprising:
configuring the front aerodynamic element and the rear aerodynamic element each to independently move to respective deployment positions between respective stowed positions and respective fully-extended positions;
obtaining the respective detected position of the rear aerodynamic element at a previous time-step, via the at least one position sensor;
wherein the front aerodynamic element and the rear aerodynamic element are interdependent such that the front target position for the front aerodynamic element at the current time step is dependent at least partially on the respective detected position of the rear aerodynamic element at the previous time-step and the rear target position for the rear aerodynamic element at the current time step is dependent at least partially on the respective detected position of the front aerodynamic element at the previous time-step;
obtaining at least one vehicle state parameter at the previous time-step, via the controller;
obtaining a front characterization dataset for predefined combinations of the respective deployment positions of the front and rear aerodynamic elements, via the controller;
obtaining a desired front lift factor for the front aerodynamic element at the current time step, via the controller;
obtaining the front target position for the front aerodynamic element at the current time step based at least partially on the respective detected position of the rear aerodynamic element at the previous time-step, the desired front lift factor, the at least one vehicle state parameter at the previous time-step and the front characterization dataset, via the controller; and
controlling the front aerodynamic element based on the front target position.

2. The method of claim 1, further comprising:
obtaining the respective detected position of the front aerodynamic element at the previous time-step, via the at least one position sensor;
obtaining a desired rear lift factor for the rear aerodynamic element at the current time step, via the controller;
obtaining the rear target position for the rear aerodynamic element at the current time step based at least partially on the detected position of the front aerodynamic element at the previous time-step, the desired rear lift factor, the at least one vehicle state parameter at the previous time-step and the rear characterization dataset, via the controller; and
controlling the rear aerodynamic element based on the rear target position.

3. The method of claim 1, wherein obtaining the at least one vehicle state parameter at the previous time-step includes:
obtaining a vehicle roll angle at the previous time-step.

4. The method of claim 1, wherein obtaining the at least one vehicle state parameter at the previous time-step includes:
obtaining a vehicle pitch angle at the previous time-step.

5. The method of claim 1, wherein the vehicle includes a front axle and a first ride sensor configured to operate with the controller and wherein obtaining the at least one vehicle state parameter at the previous time-step includes:
obtaining a front ride height at the previous time-step via the first ride sensor, the front ride height being a distance between a lowest point of a vehicle body at a center of the front axle and a ground level.

6. The method of claim 1, wherein the vehicle includes a rear axle and a second ride sensor configured to operate with the controller and wherein obtaining the at least one vehicle state parameter at the previous time-step includes:
obtaining a rear ride height at the previous time-step via the second ride sensor, the rear ride height being a distance between a center of the rear axle and a ground level.

7. A vehicle having first and second portions, the vehicle comprising:
a first front aerodynamic element located in the first portion;
a first rear aerodynamic element located in the second portion;
wherein the front and rear aerodynamic elements are each configured to independently move to respective deployment positions between respective stowed positions and respective fully-extended positions;
wherein the front aerodynamic element and the rear aerodynamic element are interdependent such that a front target position for the front aerodynamic element at a current time step is dependent at least partially on a respective detected position of the rear aerodynamic element at a previous time-step and a rear target position for the rear aerodynamic element at the current time step is dependent at least partially on a respective detected position of the front aerodynamic element at the previous time-step;
a controller configured to operate with each of the front and rear aerodynamic elements, the controller having a processor and tangible, non-transitory memory;
wherein the controller is programmed to obtain the front target position for the front aerodynamic element at the current time step based at least partially on at least one vehicle state parameter at the previous time-step and the respective detected position of the rear aerodynamic element at the previous time-step; and wherein the controller is programmed to obtain the rear target position for the rear aerodynamic element at the current time step based at least partially on the at least one vehicle state parameter at the previous time-step and the respective detected position of the front aerodynamic element at the previous time-step.

8. The vehicle of claim 7, wherein obtaining the front target position for the front aerodynamic element at the current time step includes:
obtaining the respective detected position of the rear aerodynamic element at the previous time-step;
obtaining the at least one vehicle state parameter at the previous time-step;
obtaining a desired front lift factor for the front aerodynamic element at the current time step; and
obtaining a front characterization dataset for predefined combinations of the respective deployment positions of the front and rear aerodynamic elements.

9. The vehicle of claim 8, wherein obtaining the rear target position for the rear aerodynamic element at the current time step includes:
obtaining a respective detected position of the front aerodynamic element at the previous time-step;
obtaining the at least one vehicle state parameter at the previous time-step;
obtaining a desired rear lift factor for the rear active aerodynamic element at the current time step; and
obtaining a rear characterization dataset for predefined combinations of the respective deployment positions of the front and rear aerodynamic elements.

10. The vehicle of claim 9, wherein:
the at least one vehicle state parameter at the previous time-step includes a vehicle roll angle.

11. The vehicle of claim 9, wherein:
the at least one vehicle state parameter at the previous time-step includes a vehicle pitch angle.

12. The vehicle of claim 9, wherein:
the at least one vehicle state parameter at the previous time-step includes both a vehicle roll angle and a vehicle pitch angle.

13. The vehicle of claim 9, further comprising:
a front axle;
a first ride sensor configured to operate with the controller and configured to detect a front ride height, the front ride height being a distance between a center of the front axle and a ground level; and
wherein the at least one vehicle state parameter includes the front ride height.

14. The vehicle of claim 9, further comprising:
a rear axle;
a second ride sensor configured to operate with the controller and configured to detect a rear ride height, the rear ride height being a distance between a center of the rear axle and a ground level; and
wherein the at least one vehicle state parameter includes the rear ride height.

15. The vehicle of claim 9, wherein:
the at least one vehicle state parameter at the previous time-step includes a cross-wind angle, the cross-wind angle being defined as an angle between a central longitudinal axis of the vehicle and an external air-flow direction.

16. A vehicle having first and second portions, the vehicle comprising:
a first front aerodynamic element and a second front aerodynamic element located in the first portion;
a first rear aerodynamic element and a second rear aerodynamic element located in the second portion;
wherein the first and second front aerodynamic elements and first and second rear aerodynamic elements are each configured to independently move to respective deployment positions between respective stowed positions and respective fully-extended positions;
a controller configured to operate with each of the front and rear aerodynamic elements, the controller having a processor and tangible, non-transitory memory;
wherein the controller is programmed to obtain a first front target position for the first front aerodynamic element at a current time step based at least partially on respective detected positions of the second front aerodynamic element, the first rear aerodynamic element and the second rear aerodynamic element, each at the previous time-step; and
wherein the controller is programmed to obtain a first rear target position for the first rear aerodynamic element at the current time step based at least partially on respective detected positions of the second rear aerodynamic element, the first front aerodynamic element and the second front aerodynamic element, each at the previous time-step.

17. The vehicle of claim 16, wherein:
the controller is programmed to obtain a second front target position for the second front aerodynamic element at the current time step based at least partially on respective detected positions of the first front aerodynamic element, the first rear aerodynamic element and the second rear aerodynamic element, each at the previous time-step; and
the controller is programmed to obtain a second rear target position for the second rear aerodynamic element at the current time step based at least partially on respective detected positions of the first rear aerodynamic element, the first front aerodynamic element and the second front aerodynamic element, each at the previous time-step.

* * * * *

UNITED STATES PATENT AND TRADEMARK OFFICE
CERTIFICATE OF CORRECTION

PATENT NO. : 10,035,549 B2
APPLICATION NO. : 15/210203
DATED : July 31, 2018
INVENTOR(S) : Chris Morgan Page 1 of 1

It is certified that error appears in the above-identified patent and that said Letters Patent is hereby corrected as shown below:

In the Claims

Column 9, Line 28, in Claim 1, "at a current time step a vehicle" should read --at a current time step in a vehicle--

Signed and Sealed this
Fourth Day of December, 2018

Andrei Iancu
*Director of the United States Patent and Trademark Office*